United States Patent [19]

Cooper

[11] Patent Number: 5,800,099
[45] Date of Patent: Sep. 1, 1998

[54] HOLE SAW GUIDE CLAMP SYSTEM

[76] Inventor: Michael S. Cooper, 105 W. Jomax Rd., Phoenix, Ariz. 85027

[21] Appl. No.: 587,301

[22] Filed: Jan. 16, 1996

[51] Int. Cl.⁶ ................................................ B23B 47/28
[52] U.S. Cl. .................. 408/1 R; 408/97; 408/103; 408/241 B
[58] Field of Search .................... 408/1 R, 103, 408/104, 105, 108, 97, 115 B, 115 R, 72 B, 237, 239 R, 240, 241 B

[56] References Cited

U.S. PATENT DOCUMENTS

| | | | |
|---|---|---|---|
| 957,721 | 5/1910 | Troup | 408/105 |
| 2,181,746 | 11/1939 | Siebrandt | 408/97 X |
| 2,670,635 | 3/1954 | Evans | 408/103 |
| 4,060,333 | 11/1977 | White | 408/103 |
| 5,118,228 | 6/1992 | Story | 408/115 R |
| 5,163,792 | 11/1992 | Slavik | 408/104 X |
| 5,322,396 | 6/1994 | Blacker | 408/97 X |

Primary Examiner—Daniel W. Howell
Assistant Examiner—Henry W. H. Tsai
Attorney, Agent, or Firm—Martin L. Stoneman

[57] ABSTRACT

This invention provides a system for using a portable tool for assisting the making of holes in installed pipes, such as water pipes and the like, to prepare for interconnected piping. Such system preferably utilizes a hole saw guide bushing which is contained in a clamp-head at the end of the fixed jaw of a "Vise-Grip™"-like device. Such clamp-head accommodates various sizes of guide bushings and hole-saws for making various size holes in various size pipes. Other features assist accurate hole positioning, e.g., horizontal and vertical levels, center marks, and V-shaped holding surfaces on the clamp-heads.

11 Claims, 3 Drawing Sheets

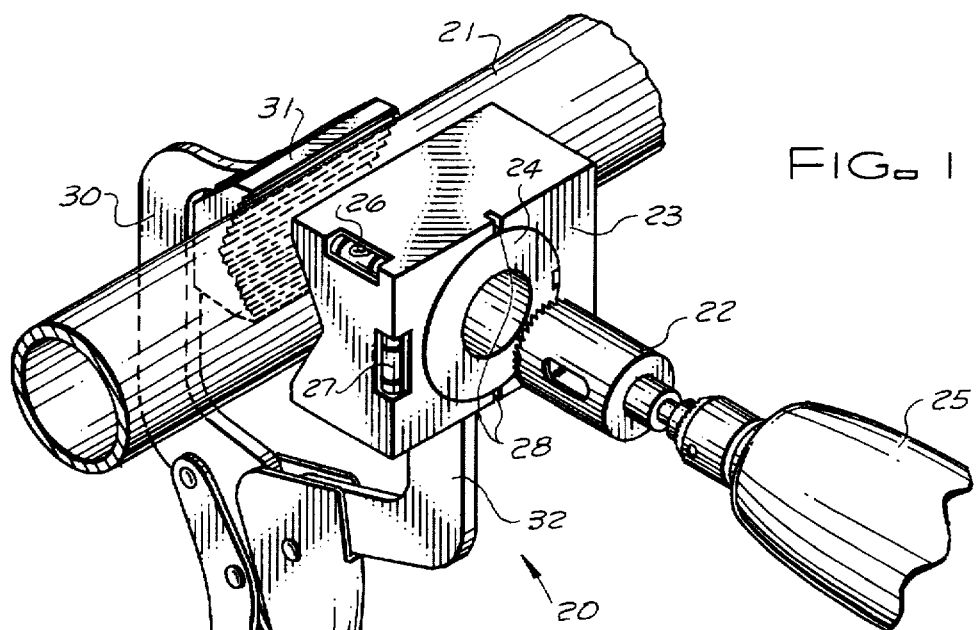
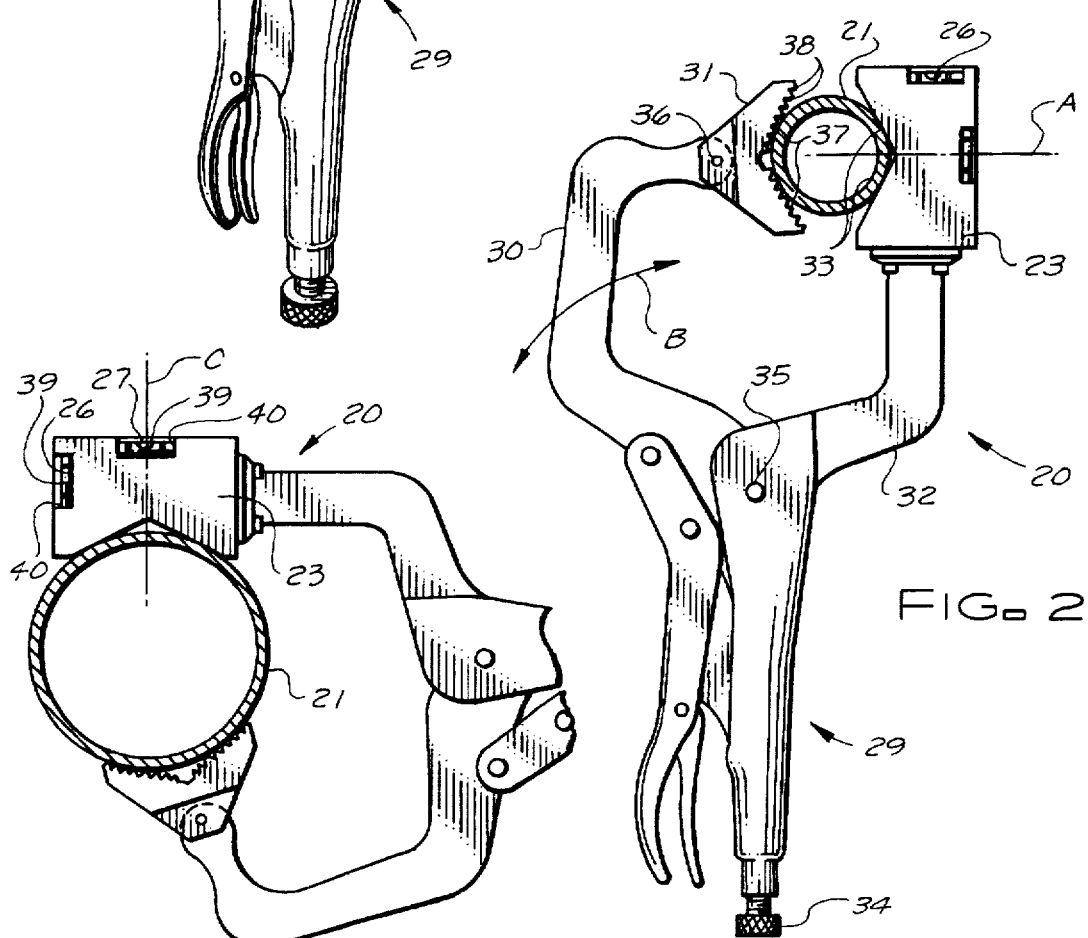
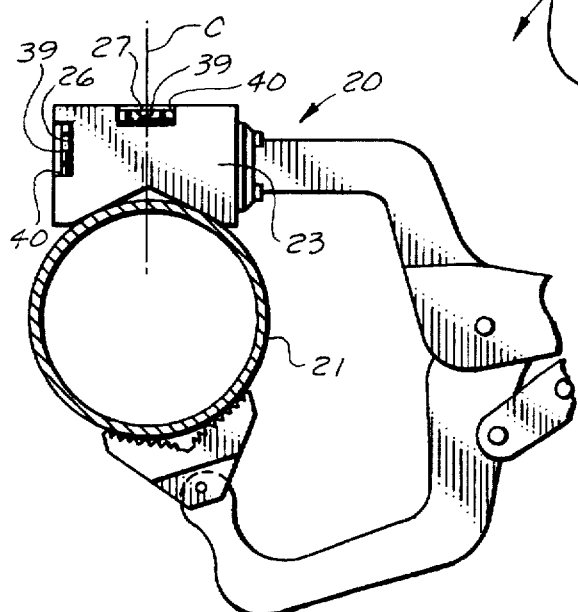

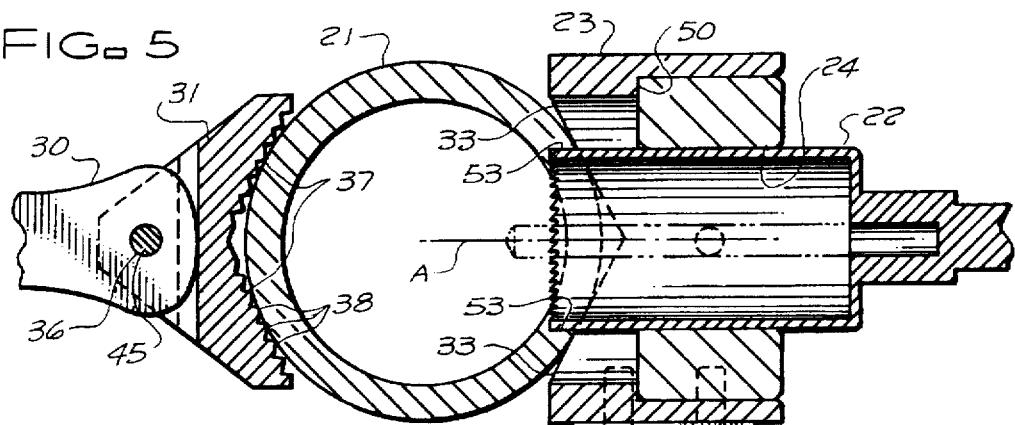
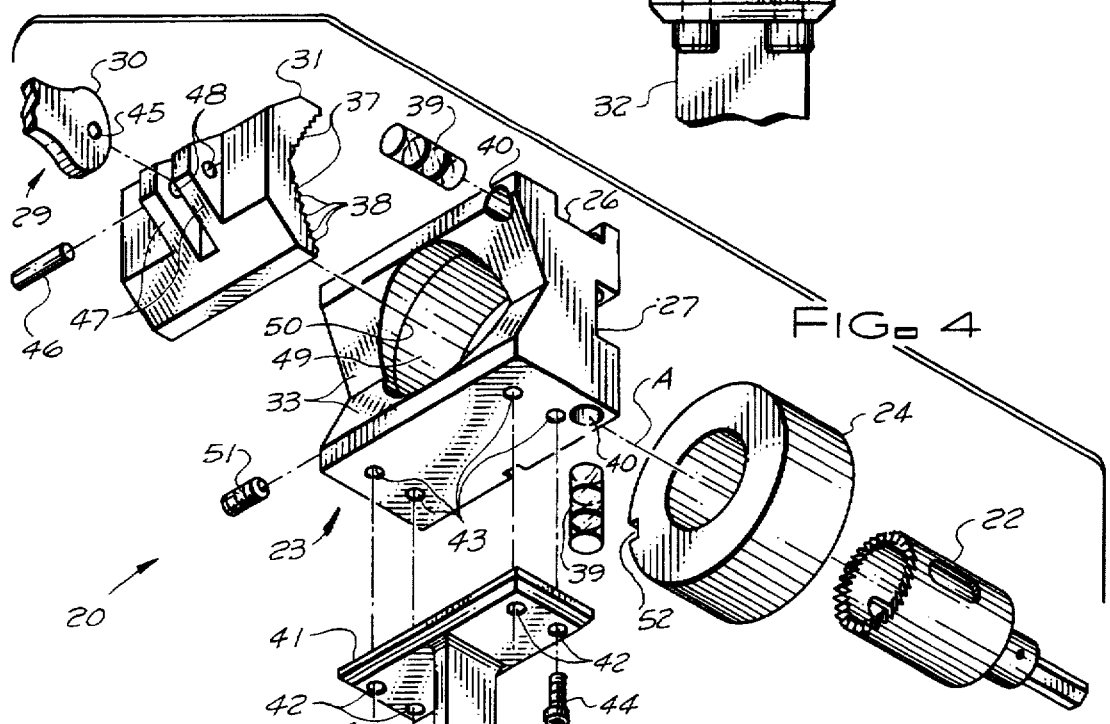
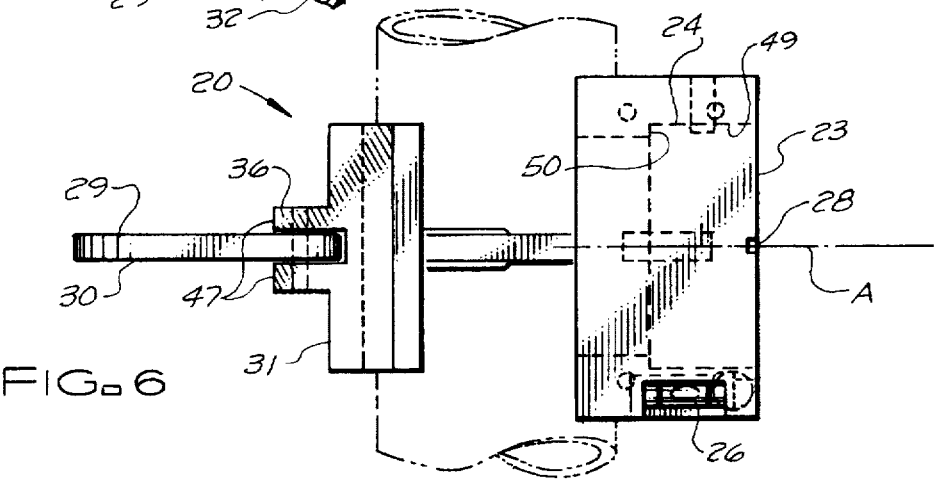

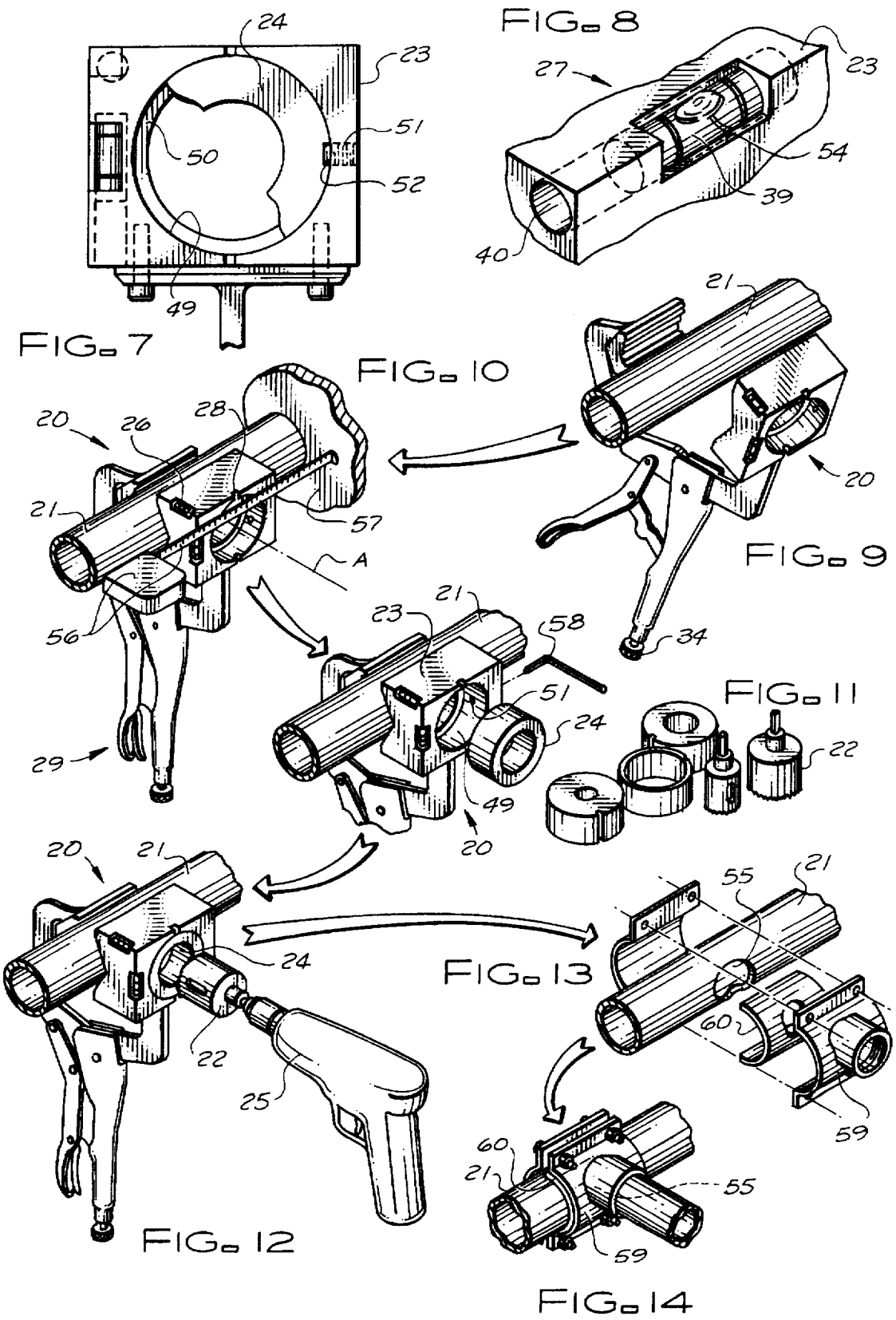

HOLE SAW GUIDE CLAMP SYSTEM

BACKGROUND OF THE INVENTION

1. Field of the Invention

This invention relates to providing a system for using a portable tool for assisting the making of holes in installed pipes, such as in water pipes and the like to prepare for interconnected piping. More particularly, this invention concerns such a system utilizing a hole saw guide.

2. Description of the Prior Art

Typically, when pipe fitting, or, more specifically, drilling holes in the wall of round pipe (or tubing), a substantial challenge is encountered. The difficulty is related to locating, positioning, and holding the hole-cutting means, e.g., a drill, in a stable and accurate manner. When holes are pre-drilled in a machine shop, prior to installation of the pipe, common machine tools and fixtures are used and these generally reduce or eliminate the difficulty of the task. However, when performing this task in the field on pipes already installed, such machine tools and fixtures are not available or possible to use. When field fitting piping, such as steel water piping used for sprinkler systems, locations for interconnecting runs might not be easily predetermined, particularly if a branch run is later added to a previously installed system. This precludes the use of heavy and large tools such as milling machines and mill vises. When drilling a hole, and more specifically a large hole, into the round surface of pipe, a hole saw is commonly used. The hole saw, instead of cutting all the material within the required diameter of the hole to be drilled, actually cuts or saws only the "circular" border of the hole.

Typically, the hole saw utilizes a pilot drill bit to first engage the pipe then to position the round saw while it saws through the intended material. Also, typically, the main difficulty occurs with the saw teeth attempting to evenly cut on a curved surface, often resulting in the teeth unevenly grabbing and jerking the saw. As a result, doing this common piping job is currently a difficult operation to perform. Additionally, the actual task of locating the saw to the pipe to provide a hole of accurate location is difficult; and even after the center point of the required hole is determined, a center punch is all that is used to attempt to prevent the pilot drill bit from wandering off location. Thus, in the prior art, whether the pipe to be drilled is large or small, or made of steel, of other metals, or of plastics, the field drilling of accurate side or top holes is usually an awkward operation fraught with the potential for costly errors.

OBJECTS OF THE INVENTION

It is a primary object of the present invention to address the difficulties above described and to provide a tool which is simple, lightweight and portable. A further primary object of the present invention is to provide such a tool which is easy to use and is self contained. In addition, it is a primary object of this invention to provide such a tool, as well as a method, which includes features for accurately locating the holes to be made. It is also an object to provide a method and device which may be efficiently used to make a large range of hole sizes in a variety of pipe outside diameters and assist accurate hole cuts. Other objects of this invention will become apparent with reference to the following invention descriptions.

SUMMARY OF THE INVENTION

According to a preferred embodiment of the present invention, there is provided an improved portable tool, for assisting the use of rotary means to make a hole in an installed pipe, comprising, in combination: hollow-cylindrical guide means for guiding such rotary means while such rotary means is making a such hole in a such pipe; such tool being constructed and arranged to maintain user-selected relative positions between a such pipe and such rotary means while such rotary means is making a such hole in a such pipe. Such tool is also provided wherein such rotary means comprises hole-saw means. In addition, this invention provides a such tool further comprising: first clamp-head means; second clamp-head means; and grip means for adjusting and positioning such first and second clamp-head means into a user-selected clamping position about a such pipe. It further provides such tool wherein such first clamp-head means comprises bushing means for guiding a such rotary means while such rotary means is making a such hole in a such pipe; and, further, wherein such first clamp-head means comprises attachment means for removably securing such bushing means.

This invention also provides, in accordance with a preferred embodiment thereof, such an improved portable tool wherein such grip means comprises: "VISE-GRIP™"-like means having a fixed jaw end and a movable jaw end; such first clamp-head means being rigidly attached to such fixed jaw end and such second clamp-head means being swivelably attached to such movable jaw end. Further provided is such tool wherein such first and second clamp-head means each comprise V-shaped holding means for clamping a such pipe in a such user-selected clamping position; and, further, wherein such V-shaped holding means of such first clamp-head means comprises a smooth surface; and, further, wherein such V-shaped holding means of such second clamp-head means comprises a toothed surface.

Even further, this invention provides such an improved portable tool wherein such first clamp-head means comprises first levelling means for visual measurement for levelling such first clamp-head means; and, further, wherein such first clamp-head means comprises second levelling means perpendicular to such first levelling means for visual measurement for levelling such first clamp-head means; and, further, wherein such first and second levelling means have a white background for improved such visual measurement; and, further, wherein such first clamp-head means comprises center-mark means for assisting in locating a longitudinal position along a such pipe at which to locate such tool to make a such hole.

Even additionally, according to a preferred embodiment thereof, the present invention provides a method for making a hole in an installed pipe, comprising the steps of: securely positioning a hole-saw guide cylinder adjacent such pipe in a user-selected position; using such hole-saw guide cylinder to guide a hole-saw sized to fit such hole-saw guide cylinder, sawing a such hole in such pipe. Also, this invention provides such method wherein such step of securely positioning comprises the steps of: securely clamping such pipe in such user-selected position with portable clamp means, such portable clamp means comprising a rigid frame for holding such hole-saw guide cylinder; and removably securing such hole-saw guide cylinder in such rigid frame. Further, this invention provides such method further comprising the step of using position-information means on such portable clamp means, positioning such portable clamp means on such pipe to make a horizontal such hole in such pipe at such user-selected position. Also it provides such method further comprising the step of using position-information means on such portable clamp means, positioning such portable clamp means on such pipe to make a vertical such hole in such pipe at such user-selected position.

Moreover, according to a preferred embodiment of the present invention, there is provided a "VISE-GRIP™"-like device for assisting the use of rotary means to make a hole in an installed pipe, comprising, in combination: a portable clamp having a fixed jaw end and a movable jaw end; a first clamp-head rigidly attached to such fixed jaw end; a second clamp-head swivelably attached to such movable jaw end; such first clamp-head being constructed and arranged for removably receiving a hole-saw-guide bushing; and grip means for adjusting and positioning such first and second clamp-heads into a user-selected clamping position. Further, this invention provides such a device wherein such fixed jaw end is directionally longitudinally situate with respect to such grip means and wherein such movable jaw end is directionally transversely situate with respect to such grip means. And it provides such a device wherein such first and second clamp-heads each comprise V-shaped holding means, such V-shaped holding means of such first clamp-head comprising a smooth surface and such V-shaped holding means of such second clamp-head comprising a toothed surface.

BRIEF DESCRIPTION OF THE DRAWINGS

FIG. 1 is a perspective view of a preferred embodiment of the hole saw guide clamp system of the present invention, shown in position for use in making a hole in the sidewall of a round pipe.

FIG. 2 is a side view of the preferred embodiment of the hole saw guide clamp shown in FIG. 1, shown clamped.

FIG. 3 is a partial side view of the illustrated hole saw guide clamp, shown clamped.

FIG. 4 is a partial exploded perspective view of the illustrated hole saw guide clamp.

FIG. 5 is a cross-sectional view of the illustrated hole saw guide clamp, in use with a hole saw.

FIG. 6 is a top view of the illustrated hole saw guide clamp.

FIG. 7 is a partial front view of a clamp-head and bushing means of the illustrated hole saw guide clamp.

FIG. 8 is a partial perspective view of the clamp-head of FIG. 7 illustrating a levelling means of the present invention.

FIGS. 9 through 14 illustrate in perspective view a preferred embodiment of the method of use of the illustrated hole saw guide clamp according to the system of this invention.

DETAILED DESCRIPTION OF A PREFERRED EMBODIMENT AND THE BEST MODE OF PRACTICE

Illustrated in FIG. 1, and shown in perspective view, according to a preferred embodiment of this invention, is portable tool 20 of the present invention, used to assist in making a hole in the wall (usually a side wall or top wall) of an installed pipe 21 (or round tubing) with rotary means, preferably a hole saw means embodied by hole saw 22. The installed pipe 21 to be drilled/sawed as shown may be metal such as steel or copper or of plastic and may be piping used for various purposes such as supplying water for fire prevention systems. Of course, the installed pipe 21 may be used for other purposes such as supplying other liquids or air. The need for the use of the portable tool 20 universally occurs when a round hole is needed in the wall of an installed pipe 21. This occurs when a side branch or fitting must be installed on the wall of the pipe. The resulting hole would then be used (in well-known ways) for welding on a branch pipe, a common branch weld fitting, or a gasketed clamp-on branch fitting.

The portable tool 20 is used primarily in conjunction with a conventional hole saw 22 but may also be used with a conventional drill bit. Preferably, the portable tool 20 may be used when the diameter of the required hole would be large enough to desire the use of a hole saw 22. The primary working part of the portable tool 20 is the guiding clamp-head means embodied by guiding clamp-head 23, which is designed to accept a bushing means, embodied by bushing 24, which positions and guides the hole saw 22 while the hole is being cut. Since a variety of hole diameters may be needed, the guiding clamp-head 23 accepts a bushing 24 which may incorporate an inside diameter of various sizes to guide a hole saw 22 with a variety of diameters. Therefore, the portable tool 20 might be supplied for use along with a variety of sizes of bushings 24 (all designed to fit within clamp-head 23) for use with a variety of sizes of hole saws. The hole saw 22 of the desired size used in conjunction with the bushing 24 of matched size will normally be powered with a rotary drill 25 to produce the desired hole.

The guiding clamp-head 23 contains a pair of levelling means, embodied by a horizontal level 26 and a vertical level 27; and it contains a center mark means embodied by center mark 28 to facilitate locating the guiding clamp-head 23 to the installed pipe 21 as will be discussed in detail later. The guiding clamp-head 23 is rigidly attached to a grip means embodied by "VISE-GRIP™"-like clamp grip 29 which is of the one piece, adjustable, locking C-clamp variety. The clamp grip 29 is conveniently operable with one hand and is preferably a means of the type popularly identified with the brand name "VISE-GRIP™"-like. Attached non-rigidly, in a swiveling locating manner to the movable (rear, as shown) jaw 30 of the clamp grip 29 is the swivelable clamp-head 31. When clamped to the installed pipe 21, the guiding clamp-head 23 is held firmly by the opposing swivelable clamp-head 31 and may then be used to position and guide the hole saw 22 while it is powered with the drill 25 to make the desired hole in installed pipe 21. The clamp grip 29 is adjustable to allow the guiding clamp-head 23 and the swivelable clamp-head 31 to firmly grip a varying range of pipe diameters.

Shown in the side view of FIG. 2 is the portable tool 20 clamped to installed pipe 21 and positioned to assist in making a hole represented with centerline A in a horizontal plane. This orientation may be accurately established by using the horizontal level 26 as a guide when clamping the portable tool 20 to the installed pipe 21. With the guiding clamp-head 23 rigidly attached to the fixed jaw 32 of clamp grip 29, it is convenient to position the guiding clamp-head 23 against the installed pipe 21 as desired. The V-shaped holding means, embodied by holding surface 33 of guiding clamp-head 23 is V-shaped to position the centerline A in the same plane as the centerline of installed pipe 21. The adjuster 34 of clamp grip 29 is used (in well-known ways) to adjust the desired clamping action and grip force against installed pipe 21. While the movable jaw 30 of tool 20 pivots in an arc B around pivot point 35 of fixed jaw 32, the swivelable clamp-head 31 contacts installed pipe 21 in a location varying with differing installed pipe 21 diameters. The swivel connection 36 self-adjusts (in well-known ways) to position the holding surface 37 (which is also V-shaped) of the swivelable clamp-head 31 into uniform contact with installed pipe 21.

To further assure a secure grip of the portable tool 20 on installed pipe 21, holding surface 37 incorporates teeth 38 positioned parallel to the installed pipe 21 providing a non-slip interface. It is noted that teeth for gripping are not incorporated on holding surface 33 of guiding clamp-head 23 in order to prevent any marring of the pipe's outer surface in the area surrounding the area where the hole is to be drilled. A smooth surface is required at this location for some styles of gasketed clamp fittings that may be installed on the installed pipe 21.

The portable tool 20 may also be accurately and easily positioned on installed pipe 21 for drilling a vertical hole with centerline C by utilizing vertical level 27 as illustrated in FIG. 3. The horizontal level 26 and vertical level 27 are of the bubble variety using a liquid filled cylindrical glass tube. The glass tubes 39 are contained within cavities 40 of the guiding clamp-head 23 as prevention against damage. Details are shown in FIGS. 4 and 8.

FIG. 4 illustrates in an exploded view the various components of the portable tool 20. The fixed jaw 32 portion of clamp grip 29 includes an integral attachment plate 41 with holes 42 for securing to guiding clamp-head 23 at threaded holes 43 with bolts 44 (only 1 of 4 is shown). The end of the movable jaw 30 of clamp grip 29 contains hole 45 for swivel attachment with pin 46 to the tangs 47 of swivelable clamp-head 31. The pin 46 is clearance fitted to hole 45 and press fitted to tangs 47 at holes 48. The holding surface 37 of swivelable clamp-head 31 is V-shaped and incorporates teeth 38. The guiding clamp-head 23 contains a round bore 49 concentric with hole centerline A. The round bore 49 incorporates a step 50 of smaller diameter to establish the depth to which bushing 24 may be inserted. Bushing 24 has an outside diameter mated to the round bore 49 with a slip fit. Bushing 24 is secured within guiding clamp-head 23 with set screw 51 tightening against slot 52, thus providing a hollow-cylindrical guide means. Shown are cavities 40 into which glass tubes 39 of horizontal level 26 and vertical level 27 are installed. The V shape of holding surface 33 is centered on the round bore 49 centerline thus positioning the hole A centerline on the same plane as the centerline of the pipe. The inside diameter of bushing 24 is sized for a slip fit to the outer diameter of hole saw 22. As mentioned, bushing 24 and hole saw 22 may be furnished in a variety of diameters to meet the requirements of the hole to be drilled.

Hole saw 22 is a common and conventional type but may be used without the normal pilot drill bit, shown along centerline A with phantom lines in FIG. 5. Guiding of the hole saw 22 into the hole (being cut) 53 of installed pipe 21 by bushing 24 is more precise than conventional guiding using the normal pilot drill bit. In addition to holding the hole saw 22 on the intended hole A centerline, the bushing 24 provides guidance to the direction or angle of cut. This is much more accurate to an action of a hole saw guided by a pilot drill bit alone. Shown also in FIG. 5 is the center positioning of guiding clamp-head 23 to installed pipe 21 by the holding surface 33 being of V shape which in turn positions the hole saw 22 directed towards the installed pipe 21 centerline. Also shown is the secure clamping to the installed pipe 21 through the self-aligning action of the movable jaw 30 and swivelable clamp-head 31 with its holding surface being V-shaped. In addition to the clamp-heads 23 and 31 being able to be clamped tightly to installed pipe 21, the teeth 38 of swivelable clamp-head 31 prevent the tool 20 from rotating around the installed pipe 21.

In FIG. 6 are shown the components of the portable tool 20 from the top view. The guiding clamp-head 23 with the horizontal level 26 is shown. Center mark 28 is located on centerline A. In dotted lines is the round bore 49 for receiving the bushing 24 and the step 50 for positioning the insertion depth of bushing 24. Shown also is the swivel connection 36 of the movable jaw 30 of clamp grip 29 to the tangs 47 of swivelable clamp-head 31.

A front view (FIG. 7) of the guiding clamp-head 23 shows the location of set screw 51 in a threaded hole of the guiding clamp-head 23 and securing the bushing 24 in place in the round bore 49. The slot 52 of bushing 24 is the point that set screw 51 tightens against. Also shown is step 50 of round bore 49.

A detail of a level typical of the horizontal level 26 and vertical level 27 is shown in FIG. 8. The liquid filled glass tube 39 is inserted into a round cavity 40 of guiding clamp-head 23 either parallel or perpendicular to the hole centerline A, to a depth centered under machined recess 54. The level is preferably a conventional bubble level containing an air bubble in the liquid and is registered between circular lines on the glass tube (in well-known ways). Because the level is at some depth within the guiding clamp-head 23 shadows and there is frequently lack of lighting against the dark background of this clamp-head, reading the air bubble's location is difficult. Therefore it is preferred that the cavity 40 (or the glass tube 39 on its inward surface) be painted with white paint (or an equivalent) prior to assembly. This white background enhances the reading of the level. The glass tube 39 is retained within the cavity 40 of the guiding clamp-head 23 by potting or other conventional method.

The preferred method of use of the preferred system of using portable tool 20 in producing a hole 55 in installed pipe 21 is illustrated in sequence in FIGS. 9 through 14. In FIG. 9 the portable tool 20 is positioned and adjusted for diameter of the installed pipe 21 with adjuster 34. The method of adjusting and clamping is well-known and is the same as with other commonly used locking C-clamps. Prior to firmly clamping the portable tool 20 to installed pipe 21, portable tool 20 is positioned and located for desired placement of the hole that is to be cut. As shown in FIG. 10, the center mark 28, being on the centerline A of the hole to be cut may be used as a convenient measuring point with a measuring device 56 to position the portable tool 20 a desired distance from a wall 57 (or from other pipe connections or related features). Additionally, the included levels, in this case the horizontal level 26, may be used to correctly position the portable tool 20. After positioning, the portable tool 20 may be secured to the installed pipe 21 by squeezing the clamp grip 29, to the position shown in FIGS. 10 and 11.

Also, after determining the diameter of the hole to be cut into the installed pipe 21, the appropriate hole saw 22 and a mating bushing 24 are selected. The bushing 24 is inserted into the round bore 49 of the guiding clamp-head 23 and secured in place with set screw 51 and tightened with a suitable wrench 58 (see FIG. 11).

As shown in FIG. 12, the selected hole saw 22, being chucked into drill 25, is inserted into bushing 24 and the hole then is cut through the wall of installed pipe 21 by advancing the hole saw 22 as it is guided by the bushing 24. After withdrawing the hole saw 22 and the slug from the hole cut, and after unclamping and removing the portable tool 20 from the installed pipe 21, the hole 55 is completed and ready for its intended usage.

In FIG. 13 is shown a style of bolt-on clamp port 59 which uses a gasket 60 to provide sealing around the hole 55 in the installed pipe 21. To provide a leakproof seal, the pipe surface (as mentioned hereinbefore) should remain unmarred, as is provided using the portable tool 20. FIG. 14 shows a typical clamp port 59 sealed with a gasket 60 installed on installed pipe 21 over hole 55 and with its interconnecting piping typically installed.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. An improved portable tool, for assisting the use of hole-saw means for making a hole in only a first side of a hollow installed pipe, comprising, in combination:

a. hollow-cylindrical hole-saw guide means, having an axis, for guiding hole-saw means while said hole-saw means is making a said hole in only said first side of said hollow installed pipe;

b. said tool being constructed and arranged to maintain user selected relative positions between said hollow installed pipe and said hole-saw means while said hole-saw means is making said hole in only said first side of said hollow installed pipe;

c. first fixed clamp-head means for positioning said hollow-cylindrical hole-saw guide means adjacent said first side of said hollow installed pipe;

d. second movable and swivelable clamp-head means for holding a second side, opposed to said first said side, of said hollow installed pipe in such manner as to have the centerline of said hollow installed pipe intersect said axis of said hollow cylindrical hole-saw guide means;

e. said second movable and swivelable clamp-head means comprising a V-shaped member solid and closed along said axis of said hollow cylindrical hole-saw guide means; and f. grip means for adjusting and positioning said first and second clamp-head means into a user-selected clamping position about said hollow installed pipe.

2. An improved portable tool according to claim 1, wherein said grip means comprises:

a. VISE-GRIP(™)-like means having a fixed jaw end and a movable jaw end;

b. said first clamp-head means being rigidly attached to said fixed jaw end and said second clamp-head means being swivelably attached to said movable jaw end.

3. An improved portable tool according to claim 2, wherein said first and second clamp-head means each comprise V-shaped holding means for clamping a said hollow-installed pipe in a said user-selected clamping position.

4. An improved portable tool according to claim 3, wherein said V-shaped holding means of said first clamp-head means comprises a smooth surface.

5. An improved portable tool according to claim 4, wherein said V-shaped holding means of said second clamp-head means comprises a toothed surface.

6. An improved portable tool according to claim 5, wherein said first clamp-head means comprises first levelling means for visual measurement for levelling said first clamp-head means.

7. An improved portable tool according to claim 6 wherein said first clamp-head means comprises second levelling means perpendicular to said first levelling means for visual measurement for levelling said first clamp-head means.

8. An improved portable tool according to claim 7 wherein said first and second levelling means have a white background for improved said visual measurement.

9. An improved portable tool according to claim 8 wherein said first clamp-head means comprises center-mark means for assisting in locating a longitudinal position along a said hollow installed pipe at which to locate said tool to make a said hole in only said first side of said hollow installed pipe.

10. A method for making a hole in only a first side of a hollow installed pipe, comprising the steps of:

a. securely positioning a hole-saw guide cylinder adjacent said first side of said hollow installed pipe in a user-selected position;

b. using said hole-saw guide cylinder to guide a hole-saw sized to fit said hole-saw guide cylinder in such manner as to saw a said hole in only a first side of said hollow installed pipe;

c. wherein said step of securely positioning comprises the steps of:

i. securely clamping said pipe in said user-selected position with portable clamp means, said portable clamp means comprising a rigid frame for holding said hole-saw guide cylinder; and ii. removably securing said hole-saw guide cylinder in said rigid frame;

d. using position-information means on said portable clamp means, positioning said portable clamp means on said hollow installed pipe to make a horizontal said hole in only a first side of said hollow installed pipe at said user-selected position.

11. A method for making a hole in only a first side of a hollow installed pipe, comprising the steps of:

a. securely positioning a hole-saw guide cylinder adjacent said first side of said hollow installed pipe in a user-selected position;

b. using said hole-saw guide cylinder to guide a hole-saw sized to fit said hole-saw guide cylinder in such manner as to saw a said hole in only a first side of said hollow installed pipe;

c. wherein said step of securely positioning comprises the steps of:

i. securely clamping said pipe in said user-selected position with portable clamp means, said portable clamp means comprising a rigid frame for holding said hole-saw guide cylinder; and ii. removably securing said hole-saw guide cylinder in said rigid frame;

d. using position-information means on said portable clamp means, positioning said portable clamp means on said hollow installed pipe to make a vertical said hole in only a first side of said hollow installed pipe at said user-selected position.

* * * * *